United States Patent
Matsuo et al.

(10) Patent No.: US 9,517,798 B2
(45) Date of Patent: Dec. 13, 2016

(54) VEHICLE BODY STRUCTURE

(71) Applicant: TOYOTA JIDOSHA KABUSHIKI KAISHA, Toyota-shi (JP)

(72) Inventors: Yasuhide Matsuo, Toyota (JP); Hiroyuki Koike, Toyota (JP); Takashi Sasaki, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/734,357

(22) Filed: Jun. 9, 2015

(65) Prior Publication Data
US 2015/0360723 A1 Dec. 17, 2015

(30) Foreign Application Priority Data

Jun. 11, 2014 (JP) .................. 2014-120639

(51) Int. Cl.
*B62D 25/08* (2006.01)
*B62D 21/15* (2006.01)
*B62D 21/03* (2006.01)
*B62D 29/00* (2006.01)
*B62D 27/04* (2006.01)
*B62D 27/02* (2006.01)

(52) U.S. Cl.
CPC .............. *B62D 21/15* (2013.01); *B62D 21/03* (2013.01); *B62D 25/088* (2013.01); *B62D 27/023* (2013.01); *B62D 27/04* (2013.01); *B62D 29/007* (2013.01)

(58) Field of Classification Search
USPC .................................................. 296/203.02
See application file for complete search history.

(56) References Cited

U.S. PATENT DOCUMENTS

| | | | |
|---|---|---|---|
| 5,456,517 A * | 10/1995 | Kalian ................. | B60G 15/068 164/47 |
| 6,547,281 B1 | 4/2003 | Iwatsuki | |
| 7,404,596 B2 * | 7/2008 | Miyata ................. | B62D 25/088 296/203.02 |
| 2006/0027993 A1 * | 2/2006 | Takayanagi .......... | B60G 15/067 280/124.166 |
| 2011/0175398 A1 * | 7/2011 | Kiley ................... | B62D 63/025 296/193.04 |
| 2012/0175915 A1 | 7/2012 | Weigl et al. | |

FOREIGN PATENT DOCUMENTS

| | | |
|---|---|---|
| DE | 197 46 165 A1 | 4/1999 |
| JP | 06-286652 | 10/1994 |
| JP | 7-80570 A | 3/1995 |
| JP | 4138074 | 8/2008 |
| JP | 2010-111200 | * 5/2010 |
| JP | 2012-520207 A | 9/2012 |

* cited by examiner

*Primary Examiner* — Dennis H Pedder
(74) *Attorney, Agent, or Firm* — Oblon, McClelland, Maier & Neustadt, L.L.P.

(57) ABSTRACT

There is provided a vehicle body structure including an upper section that is integrally casted using a non-ferrous metal material, that includes a transmission section to which an external force is transmitted and a join section extending out from the transmission section, a connection section that is formed using a steel material, and that is joined to the join section by riveting, and a member section that is formed using a steel material, and that is joined to the connection section by welding.

2 Claims, 7 Drawing Sheets

VEHICLE BODY STRUCTURE

CROSS-REFERENCE TO RELATED APPLICATION

This application claims priority under 35 USC 119 from Japanese Patent application No. 2014-120639 filed on Jun. 11, 2014, the disclosure of which is incorporated by reference herein.

BACKGROUND

Technical Field

The present disclosure relates to a vehicle body structure.

Related Art

Japanese Patent Application Laid-Open (JP-A) No. H06-286652 describes a vehicle body structure of a vehicle (automobile) provided with a cast member configured including a rear suspension tower upper section to which a shock absorber or the like is attached. The cast member is integrally formed by casting left and right rear inner pillars, left and right rear suspension tower upper sections, left and right rear wheelhouses, and a cross-member linking the left and right rear wheelhouses in the vehicle width direction, using aluminum alloy or the like. Japanese Patent No. 4138074 describes a vehicle body structure of a vehicle including a pair of side members disposed to a vehicle rear section with an interval in the vehicle width direction, a cross-member disposed between the pair of side members, and a pair of suspension support members formed by casting using aluminum alloy or the like and functioning as connectors connecting the side members and the cross-member.

In the configurations described above, locations at which underbody components such as the shock absorber are attached are formed by casting, thereby achieving a reduction in weight and increased rigidity at these locations.

However, as in the configuration described in Japanese Patent No. 4138074, in a configuration in which a member manufactured by casting and input with external force is joined to another member (the cross-member), it is essential to suppress bending deformation from occurring at the joining portion of the member manufactured by casting to the other member.

SUMMARY

In consideration of the above circumstances, the present disclosure provides a vehicle body structure capable of suppressing bending deformation from occurring at a joining portion of a member manufactured by casting and configured of a different material to another member.

The first aspect of the present disclosure is a vehicle body structure including an upper section that is integrally casted using a non-ferrous metal material, that includes a transmission section to which an external force is transmitted and a join section extending out from the transmission section, a connection section that is formed using a steel material, and that is joined to the join section by riveting, and a member section that is formed using a steel material, and that is joined to the connection section by welding.

In the vehicle body structure according to the first aspect, the member section is fixed to the upper section through the connection section. In the present disclosure, the join section, to which the connection section is joined, extends from the transmission section, to which an external force is transmitted. Namely, external force transmitted to the transmission section is less liable to be transmitted to the join section. Thus bending deformation is less liable to occur at the joining portion of the join section to the connection section, thereby enabling stress occurring at the joining portion of the join section to the connection section to be alleviate when external force is transmitted to the transmission section. Moreover, in the present disclosure, the join section and the connection section are joined together by riveting, and the connection section and the member section are joined together by welding, thus enabling different materials to be joined together simply.

The second aspect of the present disclosure is the vehicle body structure of the first aspect, wherein the upper section is a pair of suspension tower upper sections disposed at the left and right in the vehicle width direction, and the member section is a cross-member connecting the pair of suspension towers through the connection section.

In the vehicle body structure according to the second aspect, the cross-member spans between the pair of suspension towers through the connection section. In the present disclosure, the join section, to which the connection section is joined, extends out from the transmission section to which road surface input is transmitted. Thus bending deformation is less liable to occur at joining portions joining the join section of the suspension towers to the connection section, thereby enabling stress occurring at the joining portions of the join section to the connection section to be alleviated when road surface input is transmitted to the transmission section of the suspension towers.

The third aspect of the present disclosure is the vehicle body structure of the first aspect or the second aspect, wherein a second moment of area with respect to a vehicle front-rear direction axis of a cross-section of the join section, taken along the vehicle front-rear direction and the vehicle up-down direction, decreases on progression toward the vehicle width direction inside.

In the vehicle body structure according to the third aspect, setting the second moment of area of the join section as above suppresses a sudden change in the distribution of stress along the vehicle width direction of the joining portion of the join section to the connection section. Namely, a stress concentration location can be suppressed from occurring at the joining portion of the join section to the connection section.

The fourth aspect of the present disclosure is the vehicle body structure of the first aspect, wherein the upper section configures portions of each of a pair of front pillars disposed at the left and right in the vehicle width direction, and the member section is a cross-member connecting the portions of the pair of front pillars together through the connection sections.

In the vehicle body structure according to the fourth aspect, the cross-member spans between the pair of front pillars through the connection section. In the present disclosure, the join section, to which the connection section is joined, extends out from the transmission section to which road surface input is transmitted. Thus bending deformation is less liable to occur at the joining portions, formed of portions of the front pillars, joining the join section to the connection section, thereby enabling stress occurring at the joining portions of the join section to the connection section to be alleviated when road surface input is transmitted to the transmission section configuring portions of the front pillars.

The vehicle body structure according to the first to the fourth aspects above enables bending deformation to be suppressed from occurring at a joining portion of a member manufactured by casting to another member.

BRIEF DESCRIPTION OF THE DRAWINGS

Exemplary embodiments of the present disclosure will be described in detail based in the following figures, wherein.

DETAILED DESCRIPTION

Vehicle Body Structure According to a First Exemplary Embodiment

Explanation follows regarding a vehicle body structure according to a first exemplary embodiment of the present disclosure, with reference to FIG. 1 to FIG. 5. Note that the arrow FR indicates the vehicle front-rear direction front side, the arrow OUT indicates the vehicle width direction outside, and the arrow UP indicates the vehicle up-down direction upper side. In the below explanation, reference to simply the front-rear and up-down directions indicates front-rear in the vehicle front-rear direction, and up-down in the vehicle up-down direction.

Figure 1:
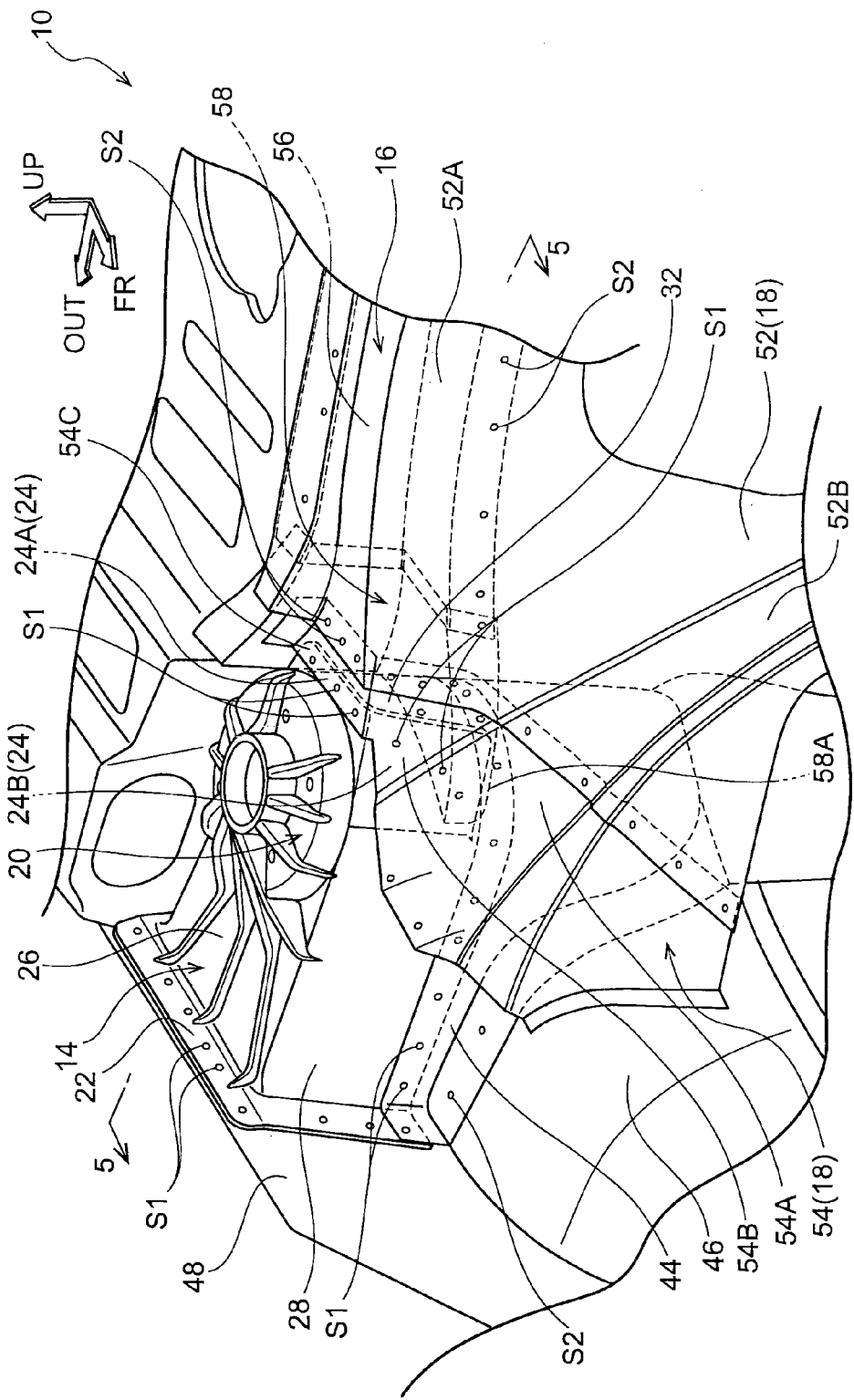
FIG. 1 is a perspective view illustrating a rear side section of a vehicle.

As illustrated in FIG. 1, a rear side section 10 of a vehicle body applied with a vehicle body structure of the present exemplary embodiment includes a suspension tower upper section 14, to which a coilover 12 (see FIG. 5), configuring part of a suspension, is attached. The rear side section 10 of the vehicle body also includes a cross-member 16 serving as a member section spanning between a suspension tower upper section disposed at the vehicle width direction right side (not illustrated in the drawings), and the suspension tower upper section 14 disposed at the vehicle width direction left side. The rear side section 10 of the vehicle body also includes a partition panel 18 forming a partition between a cabin and a trunk. Explanation first follows regarding the suspension tower upper section 14, and then regarding the partition panel 18 and the cross-member 16.

Figure 2:
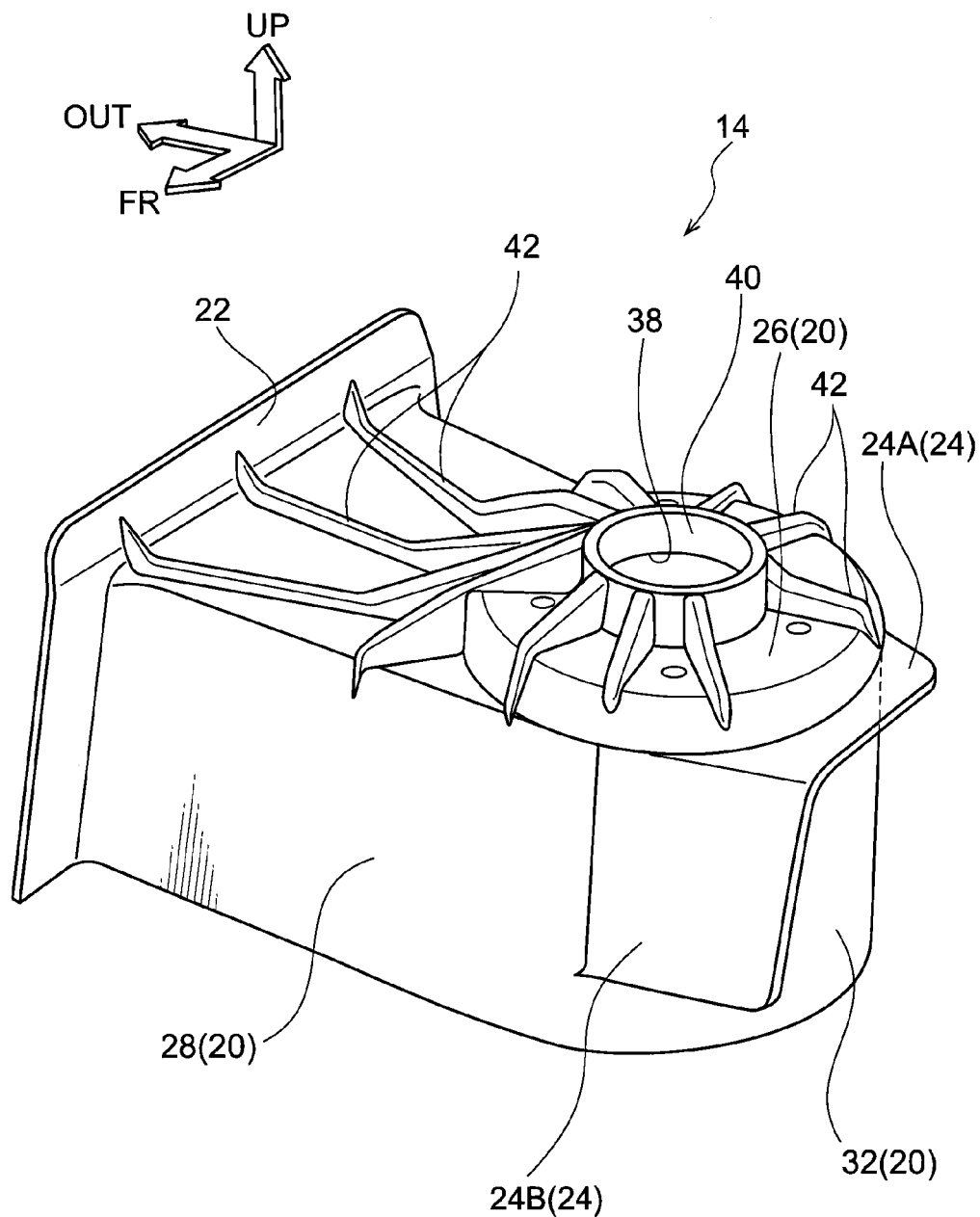
FIG. 2 is a perspective view illustrating a suspension tower.

As illustrated in FIG. 2, the suspension tower upper section 14 serving as an upper section is integrally casted using an aluminum alloy that is a non-ferrous metal material. The suspension tower upper section 14 includes a coilover fixing section 20, serving as a transmission section that is fixed to the coilover 12 and supports load input from the coilover 12, a flange portion 22 extending out from the vehicle width direction outside of the coilover fixing section 20, and a join section 24 that extends out from the vehicle width direction inside of the coilover fixing section 20 and to which the partition panel 18 and a cross-member extension 58, explained in detail later, are joined.

Figure 3:
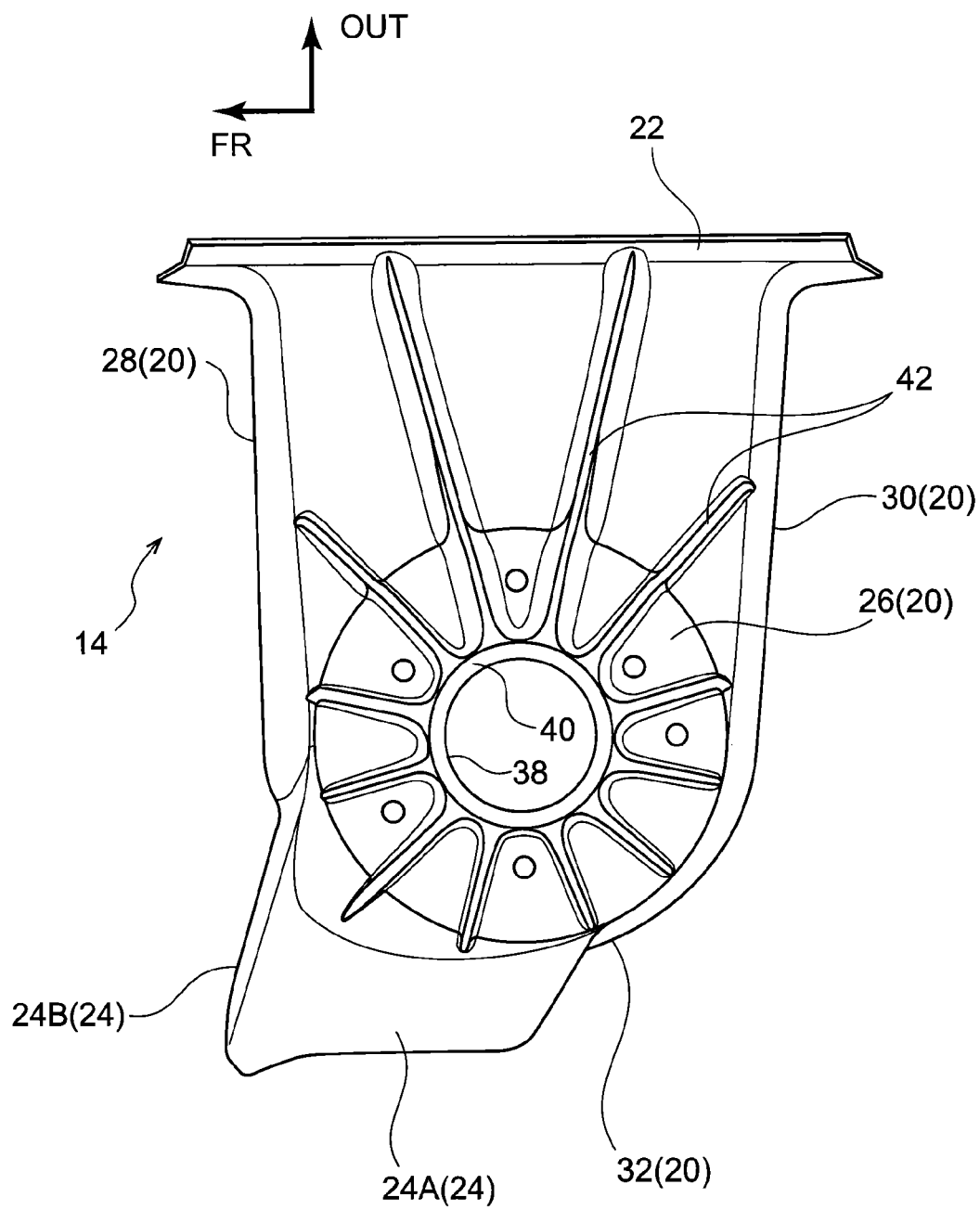
FIG. 3 is a plan view illustrating a suspension tower viewed from the vehicle upper side.
Figure 4:
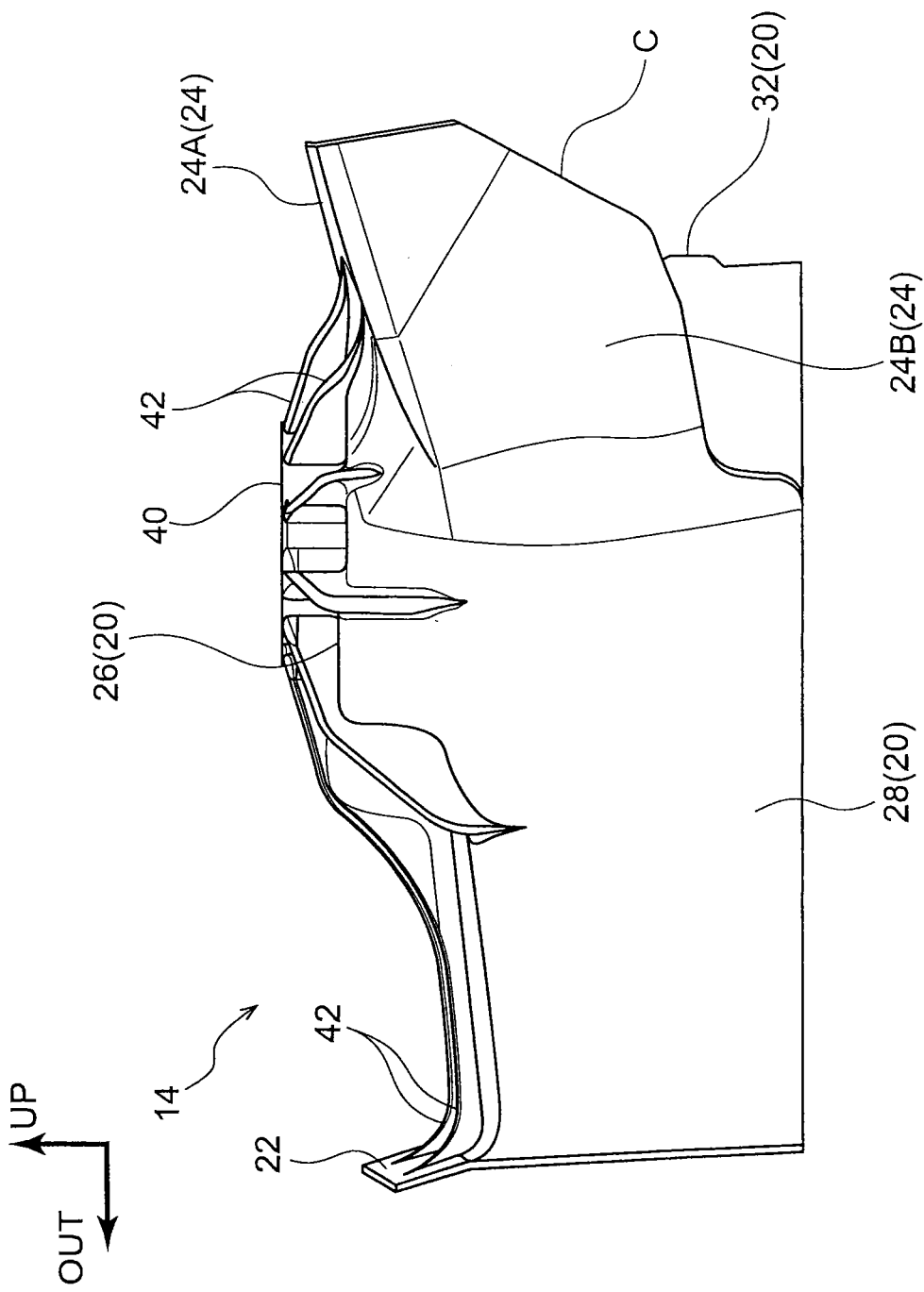
FIG. 4 is a front view illustrating a suspension tower viewed from the vehicle front side.

As illustrated in FIG. 2 to FIG. 4, the coilover fixing section 20 is formed in a rectangular box shape open toward the vehicle lower side. The coilover fixing section 20 includes an apex wall portion 26 extending in the vehicle front-rear direction and width direction with its thickness direction in the vehicle up-down direction, a front wall portion 28 and a rear wall portion 30, each bent and extending toward the vehicle lower side from a front and a rear end, respectively, of the apex wall portion 26, and an inner wall portion 32 connecting vehicle width direction inside ends of the apex wall portion 26, the front wall portion 28, and the rear wall portion 30.

Figure 5:
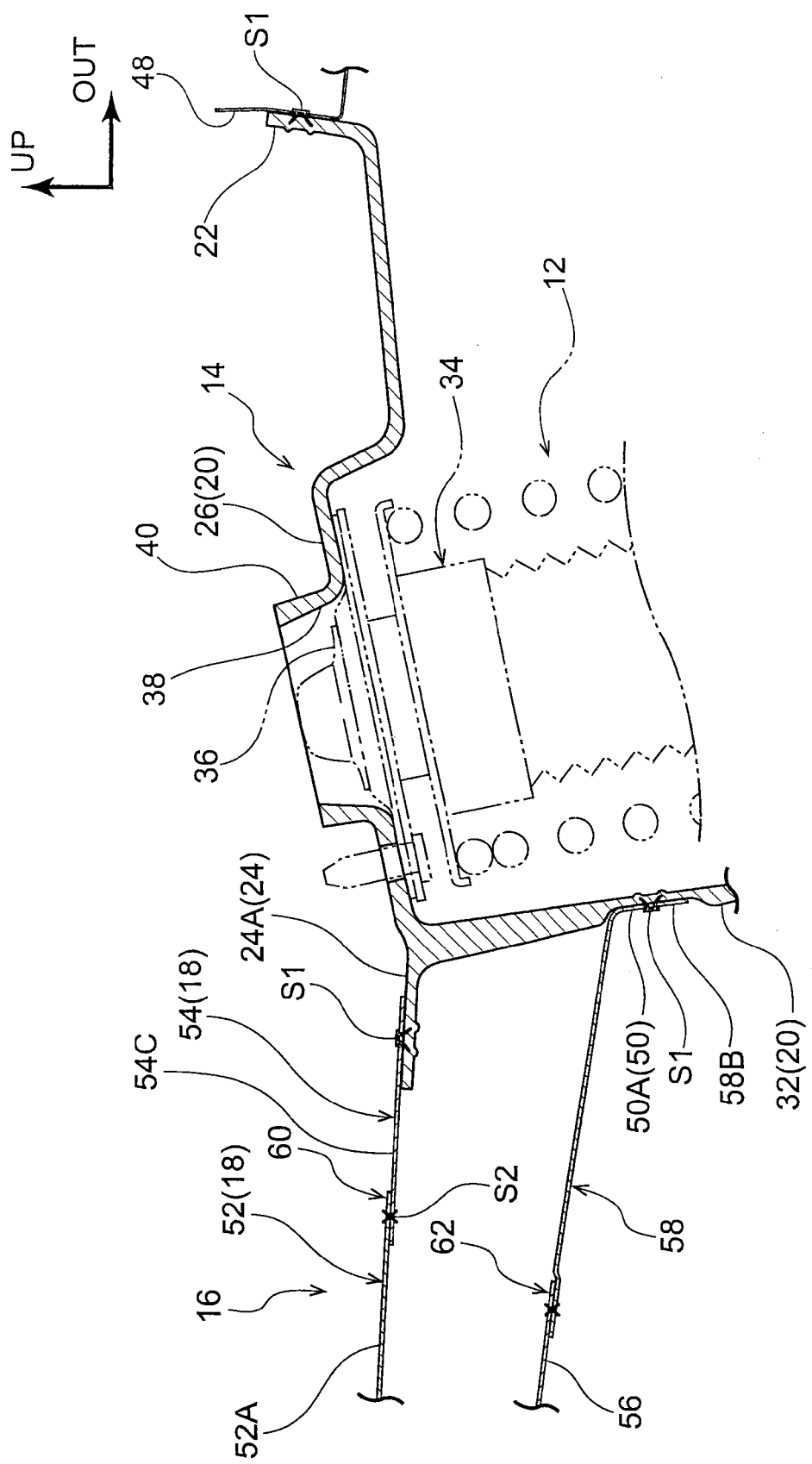
FIG. 5 is a cross-section illustrating a cross-section of the rear side section of the vehicle taken along line 5-5 illustrated in FIG. 1.

As illustrated in FIG. 5, an engagement hole 38, with which a mount 36 of a shock absorber 34 configuring a portion of the coilover 12 engages, is formed to the apex wall portion 26. As illustrated in FIG. 2 and FIG. 3, the apex wall portion 26 includes a cylindrical shaped portion 40 protruding toward the vehicle upper side and disposed coaxially to the engagement hole 38, and plural ribs 42 extending in a radial shape from an outer peripheral portion of the cylindrical shaped portion 40 toward the radial direction outside of the cylindrical shaped portion 40. Some of the plural ribs 42 extend up to the flange portion 22.

As illustrated in FIG. 1, a suspension tower lower section 44, formed by pressing or the like of a steel plate material, is joined to lower end portions of the front wall portion 28, the rear wall portion 30 (see FIG. 3), and the inner wall portion 32. The front wall portion 28, the rear wall portion 30, and the inner wall portion 32 are joined to the suspension tower lower section 44 by press-fitting SPR rivets S1. A lower end portion of the suspension tower lower section 44 is joined to a wheelhouse panel 46 by welds S2 (spot weld portions are indicated by the reference numeral S2). The flange portion 22 is joined by self-pierce rivets (SPR) S1 to a vehicle body panel 48 disposed at the upper side of the wheelhouse panel 46.

As illustrated in FIG. 5, a groove portion 50 is formed at an up-down direction intermediate portion of the inner wall portion 32, and a bottom 50A of the groove portion 50 is formed in a flat planar shape by grinding. The cross-member extension 58, described later, is joined by SPR rivets S1 to the bottom 50A of the groove portion 50.

As illustrated in FIG. 2, the join section 24, to which the partition panel 18 and the cross-member extension 58 are joined, extends from vehicle width direction inside ends of the apex wall portion 26 and the front wall portion 28 toward the vehicle width direction inside and is formed with a substantially L shaped cross-section in a vehicle side view. The portion extending with its thickness direction in the vehicle up-down direction configures a first join section 24A, and the portion extending with its thickness direction in the vehicle front-rear direction configures a second join section 24B.

As illustrated in FIG. 3, the first join section 24A is formed in a substantially rectangular shape with its length direction in the front-rear direction in a vehicle plan view, and a location at the vehicle front side of the first join section 24A projects out further toward the vehicle width direction inside than a location at the vehicle rear side of the first join section 24A.

As illustrated in FIG. 4, the second join section 24B is formed in a substantially rectangular shape in a vehicle front view, and an end C at the vehicle width direction inside and vehicle lower side of the second join section 24B slopes toward the upper side on progression toward the vehicle width direction inside. Thus the cross-section area of a cross-section of the second join section 24B, taken along the vehicle front-rear direction and the up-down direction, narrows on progression toward the vehicle width direction inside. By thus setting the cross-section of the second join section 24B, a second moment of area with respect to a vehicle front-rear direction axis of a cross-section of the join section 24 (the first join section 24A and the second join section 24B), taken along the vehicle front-rear direction and the vehicle up-down direction, decreases on progression toward the vehicle width direction inside.

As illustrated in FIG. 1, the partition panel 18 has a split structure configured including a first partition panel 52 disposed at a vehicle width direction intermediate portion, and a second partition panel 54 serving as a connection section joined to a vehicle width direction outside end portion of the first partition panel 52.

The first partition panel 52 is formed by pressing a steel plate material. A location at the vehicle upper side of the first partition panel 52 configures a cross-member configuration portion 52A, configuring a portion of the cross-member 16. An inner panel 56 disposed at the vehicle front side of the cross-member configuration portion 52A is joined to the cross-member configuration portion 52A by welds S2, and a rectangular shaped closed cross-section formed between the cross-member configuration portion 52A and the inner panel 56 thereby forms the cross-member 16 at an upper end portion of the first partition panel 52. The first partition panel 52 is also formed with a V bead 52B protruding toward the vehicle upper side and sloping toward the vehicle lower side on progression toward the vehicle width direction inside.

The second partition panel 54 is formed by pressing a steel plate material, similarly to the first partition panel 52. The second partition panel 54 is formed with a V bead 54A, corresponding to the V bead 52B formed to the first partition panel 52. The V bead 52B formed to the first partition panel 52 and the V bead 54A formed to the second partition panel 54 span between the suspension tower upper section 14 and a lower panel, thereby giving high rigidity to the rear section of the vehicle body. The second partition panel 54 also includes a front side extension portion 54B extending along a front side face of the second join section 24B, and an upper side extension portion 54C extending along an upper side face of the first join section 24A, of the suspension tower upper section 14. Vehicle width direction outside end portions of the front side extension portion 54B and the upper side extension portion 54C are joined to the second join section 24B and the first join section 24A by SPR rivets S1. Vehicle width direction inside end portions of the front side extension portion 54B and the upper side extension portion 54C are joined to vehicle width direction outside end portions of the first partition panel 52 (vehicle width direction outside end portions of the cross-member configuration portion 52A) by welds S2. A portion of the location corresponding to the V bead 54A of the second partition panel 54 is joined to the front wall portion 28 of the suspension tower upper section 14 by SPR rivets S1.

The cross-member extension 58 serving as a connection section is formed by pressing a steel plate material. The cross-member extension 58 includes a front side flange portion 58A extending along a rear side face of the second join section 24B of the suspension tower upper section 14, and, as illustrated in FIG. 5, an outside flange portion 58B extending along the bottom 50A of the groove portion 50 formed to the inner wall portion 32 of the suspension tower upper section 14 (see FIG. 5). As illustrated in FIG. 1 and FIG. 5, the front side flange portion 58A and the outside flange portion 58B are joined to the second join section 24B and the bottom 50A of the groove portion 50 (see FIG. 5), respectively, by SPR rivets S1. As illustrated in FIG. 5, a vehicle width direction inside end portion of the cross-member extension 58 is joined to a vehicle width direction outside end portion of the inner panel 56 by welds S2. In the present exemplary embodiment, a joining portion 62 of the cross-member extension 58 to the inner panel 56 is positioned further to the vehicle width direction inside than a joining portion 60 of the first partition panel 52 (cross-member configuration portion 52A) to the second partition panel 54 (upper side extension portion 54C).

Operation and Advantageous Effects of Present Exemplary Embodiment

Explanation follows regarding operation and advantageous effects of the present exemplary embodiment.

As illustrated in FIG. 1, in the vehicle body structure of the present exemplary embodiment, the cross-member 16 is fixed to the suspension tower upper section 14 through the second partition panel 54 and the cross-member extension 58.

In the present exemplary embodiment, the join section 24 to which the second partition panel 54 and the cross-member extension 58 are joined is configured extending out from the coilover fixing section 20 supporting input from the road surface. Thus bending deformation is less liable to occur at the joining portions of the second partition panel 54 and the cross-member extension 58 to the join section 24, thereby enabling stress occurring at the joining portions of the second partition panel 54 and the cross-member extension 58 to the join section 24 to be alleviated, when road surface input is transmitted to the coilover fixing section 20.

In the present exemplary embodiment, the second partition panel 54 and the cross-member extension 58 are joined to the join section 24 by the SPR rivets S1, and the second partition panel 54 and the cross-member extension 58 are joined to the cross-member 16 (the cross-member configuration portion 52A and the inner panel 56) by the welds S2, thus enabling different materials to be joined together simply.

As illustrated in FIG. 4, in the present exemplary embodiment, the end C at the vehicle width direction inside and vehicle lower side of the second join section 24B slopes toward the upper side on progression toward the vehicle width direction inside. Thus the second moment of area with respect to the vehicle front-rear direction axis of the cross-section of the join section 24 (the first join section 24A and the second join section 24B), taken along the vehicle front-rear direction and the vehicle up-down direction, decreases on progression toward the vehicle width direction inside. This suppresses a sudden change in the distribution of stress along the vehicle width direction of the joining portion of the join section 24 to the second partition panel 54 and the cross-member extension 58. Namely, stress concentration locations can be suppressed from occurring at the joining portions of the join section 24 to the second partition panel 54 and the cross-member extension 58.

Note that an example has been explained in the present exemplary embodiment in which different metals (aluminum alloy and steel) are joined together by the SPR rivets S1; however the present disclosure is not limited thereto, and other rivets may be used to join together different metals.

Vehicle Body Structure According to a Second Exemplary Embodiment

Figure 6:
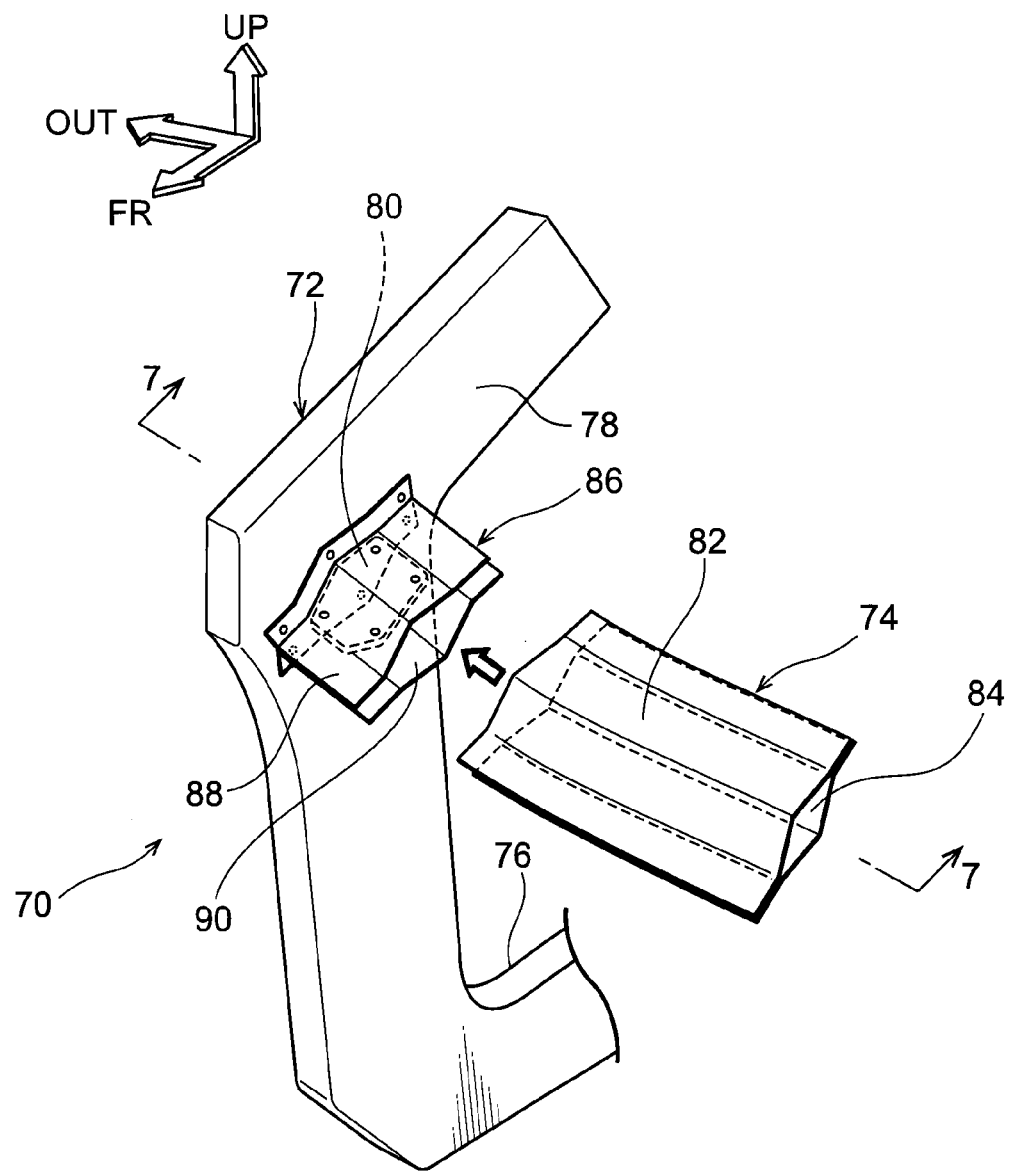
FIG. 6 is a perspective view illustrating a front inner pillar, a cowl extension, and a cowl sub-assembly.
Figure 7:
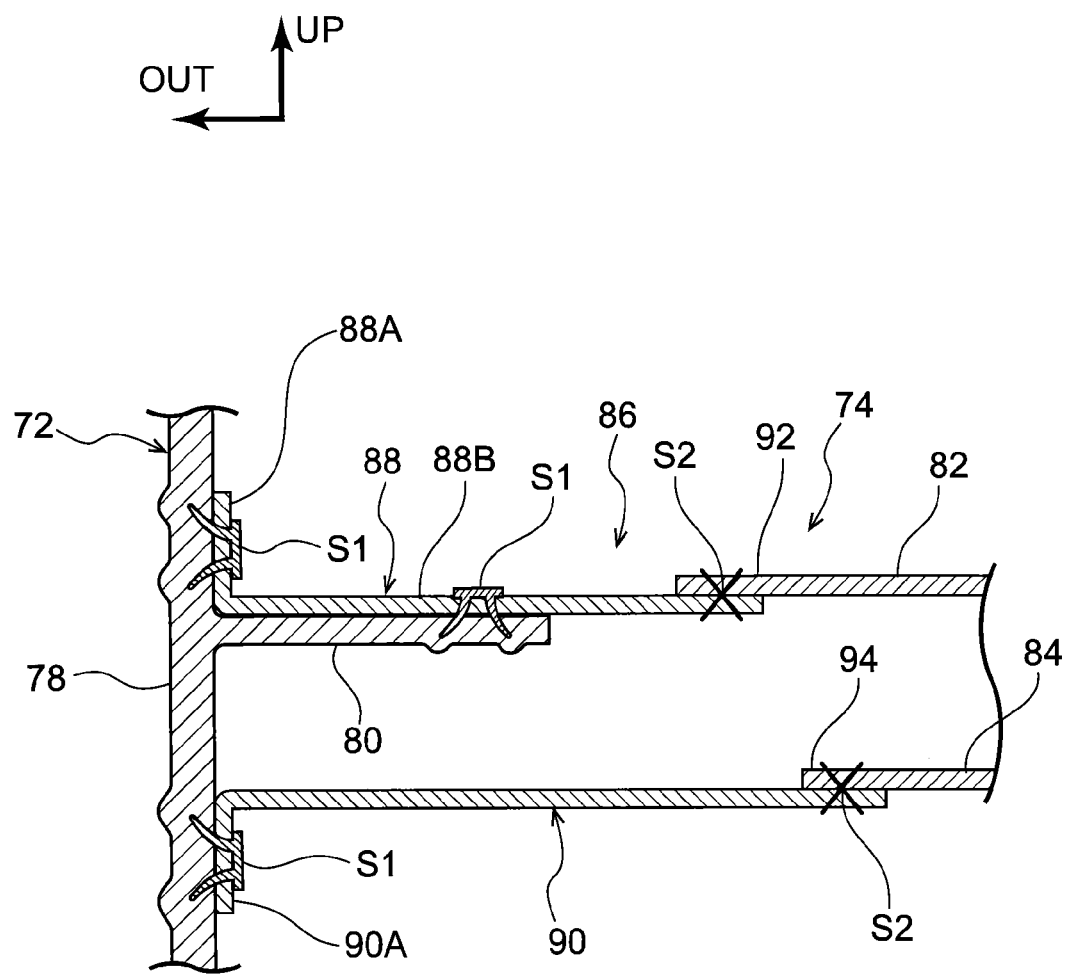
FIG. 7 is a cross-section illustrating a cross-section of the front inner pillar, the cowl extension, and the cowl sub-assembly taken along line 7-7 illustrated in FIG. 6.

Explanation follows regarding a vehicle body structure according to a second exemplary embodiment of the present disclosure, with reference to FIG. 6 and FIG. 7.

As illustrated in FIG. 6, a front section 70 of a vehicle body applied with a vehicle body structure of the present exemplary embodiment is provided with an inner die-cast 72 serving as a upper section configuring a portion of a pair of front pillars or the like respectively disposed at the left and right in the vehicle width direction, and a cross-member 74 serving as a member section spanning between the pair of front pillars.

The inner die-cast 72 is formed by casting using an aluminum alloy. The inner die-cast 72 is formed with a rectangular frame shape in a vehicle side view, thereby forming a door opening portion 76 at a side portion of the vehicle body. The location of the inner die-cast 72 formed in a rectangular frame shape forms a frame section 78 serving as a transmission section to which input from the road surface is transmitted, and configures part of the frame of the vehicle. A join section 80 formed in a tongue shape extends out from a vehicle width direction inside face of the frame section 78.

A top panel 82 and a lower panel 84, formed by press molding or the like of steel plate materials, are joined together by welding to form a rectangular shaped closed cross-section between the top panel 82 and the lower panel 84, thereby configuring the cross-member 74.

The cross-member 74 is joined to the inner die-cast 72 through a cross-member extension 86. A top extension panel 88 and a lower extension panel 90, serving as connection sections formed by press working steel plate materials or the like, are joined together by welding to form a rectangular shaped closed cross-section between the top extension panel 88 and the lower extension panel 90, thereby configuring the cross-member extension 86, similarly to the cross-member 74 previously described.

As illustrated in FIG. 7, vehicle width direction inside end portions of the top extension panel 88 and the lower extension panel 90 are joined by the welds S2 to respective vehicle width direction outside end portions of the top panel 82 and the lower panel 84. In the present exemplary embodiment, a joining portion 92 of the top extension panel 88 to the top panel 82 is positioned further to the vehicle width direction outside than a joining portion 94 of the lower extension panel 90 to the lower panel 84.

Vehicle width direction outside end portions of the top extension panel 88 and the lower extension panel 90 configure respective bent flange portions 88A, 90A, and the flange portions 88A, 90A are joined to the frame section 78 by SPR rivets S1. A vehicle width direction intermediate portion 88B of the top extension panel 88 is disposed running along an upper side face of the join section 80, and the vehicle width direction intermediate portion 88B of the top extension panel 88 and the join section 80 are joined together by SPR rivets S1.

In the modified example described above, the join section 80 to which the top extension panel 88 is joined extends out from the frame section 78 to which road surface input is transmitted. Thus the joining portion of the join section 80 to the top extension panel 88 is less liable to bending deformation when road surface input is transmitted to the frame section 78. This enables stress occurring at the joining portion of the join section 80 to the top extension panel 88 to be alleviated.

Exemplary embodiments of the present disclosure have been explained above; however the present disclosure is not limited thereto, and obviously various modifications other than those above may be implemented with a range not departing from the spirit of the present disclosure.

What is claimed is:

1. A vehicle body structure comprising:
   an upper section that is integrally casted using a non-ferrous metal material, that includes a transmission section to which an external force is transmitted and a join section extending out from the transmission section;
   a connection section that is formed using a steel material, and that is joined to the join section by riveting; and
   a member section that is formed using a steel material, and that is joined to the connection section by welding,
   wherein a second moment of area with respect to a vehicle front-rear direction axis of a cross-section of the join section, taken along the vehicle front-rear direction and the vehicle up-down direction, decreases on progression toward the vehicle width direction inside.

2. The vehicle body structure of claim 1, wherein:
   the upper section is a pair of suspension tower upper sections disposed at the left and right in the vehicle width direction; and
   the member section is a cross-member connecting the pair of suspension tower upper sections through the connection section.

* * * * *